United States Patent [19]

Bonzo

[11] Patent Number: 4,759,892
[45] Date of Patent: Jul. 26, 1988

[54] METHOD AND APPARATUS FOR ALIGNING BODY WITH HONEYCOMB STRUCTURE

[75] Inventor: Roy T. Bonzo, Painted Post, N.Y.

[73] Assignee: Corning Glass Works, Corning, N.Y.

[21] Appl. No.: 283,735

[22] Filed: Jul. 15, 1981

[51] Int. Cl.$^4$ ............... B23P 19/04; B32B 3/12; B28B 1/14; B23Q 17/22
[52] U.S. Cl. ............................. 264/251; 29/464; 29/709; 29/821; 29/DIG. 46; 264/60; 264/69; 264/264; 264/267; 428/116; 428/117; 428/188
[58] Field of Search ............... 264/69, 71, 274, 244, 264/59, 60, 251, 264, 267; 29/DIG. 46, 464, 709, 821; 428/116, 117, 188

[56] References Cited

U.S. PATENT DOCUMENTS

| | | | |
|---|---|---|---|
| 2,892,339 | 6/1976 | Flower | 264/71 |
| 3,937,773 | 2/1976 | Huffman | 264/71 |
| 4,411,856 | 10/1983 | Montierth | 264/60 X |

Primary Examiner—Jan H. Silbaugh
Assistant Examiner—Neil M. McCarthy
Attorney, Agent, or Firm—R. N. Wardell

[57] ABSTRACT

A body having a large number of protrusions is aligned with a honeycomb surface having a greater number of openings, selected openings being engaged by the protrusions when the body is aligned, by positioning the body against the honeycomb surface and vibrating it until the protrusions engage. The method is of particular use in aligning flexible masks to end faces of honeycomb structures in the fabrication of solid particulate filter bodies. Particular mask and honeycomb structure geometries are suggested for automation of the process.

21 Claims, 4 Drawing Sheets

METHOD AND APPARATUS FOR ALIGNING BODY WITH HONEYCOMB STRUCTURE

BACKGROUND OF THE INVENTION

The invention relates to honeycomb structures and in particular to methods and apparatus for aligning a body having multiple protrusions with the cells of a honeycomb structure for insertion therein.

Need for the present invention has arisen in the area of fabricating solid particulate filter bodies from honeycomb structures. The honeycomb structures being referred to typically consist of a multiplicity of mutually adjoining and substantially parallel hollow passages or cells which extend through the structure and between a pair of its opposing end faces where the open transverse cross-sections of the cells are exposed. The cells themselves are formed by thin, porous walls which extend continuously between the end faces and intersect with one another so as to form a continuous matrix across the end faces. Solid particulate filter bodies may be formed by selectively manifolding (i.e., plugging) or otherwise selectively sealing different subsets of cells at each of its end faces. Preferred filter bodies of the type being referred to are more completely described in the pending application of Rodney Frost and Irwin Lachman, Ser. No. 165,646, filed July 3, 1980, and now abandoned, entitled "FILTER AND RELATED APPARATUS", which is assigned to the assignee of this application and incorporated in its entirety by reference herein.

One method of selectively manifolding cells is to cover the end faces of the structure with a mask having openings extending through it which expose the open ends of some of the cells at the end face. A suitable material such as a cement is then charged through the mask openings into the exposed cell ends plugging them. One preferred mask embodiment is an elastic mask which in addition to having a number of openings is also provided with a number of elastic protrusions or fingers which fittably engage cells not to be plugged when the mask is aligned over the end face of the structure. The protrusions assure alignment of the openings with the cells and temporarily plug those cells with which they engage to reduce the possibility of their being inadvertently sealed. The elastic mask is more fully described in a pending application Max Montierth, Ser. No. 283,734 filed July 15, 1981, now U.S. Pat. No. 4,411,856, which is assigned to the assignee of this application and incorporated in its entirety by reference herein. As is disclosed in the Montierth application, elastic masks have been hand-fitted to the end faces of honeycomb structures by aligning the mask with an edge of an end face and then working the mask into alignment across the end face. Hand-fitting of masks is time-consuming because the protrusions will generally not engage unless and until they are in precise angular and lateral alignment with the cells, a task made more difficult by the fact that the mask may typically carry hundreds of protrusions.

SUMMARY OF THE INVENTION

It is an object of the invention to provide a method for aligning a body having a large number of protrusions extending therefrom with the openings of a honeycombed surface with which the protrusions are to engage.

It is yet another object of the invention to provide a method for more rapidly aligning such a body and surface than typically can be accomplished by hand.

It is yet another object of the invention for providing a method for aligning such a body and surface which may be automated.

Yet another object of the invention is to provide a method for aligning such a body and surface having various cross-sectional configurations.

Yet another object of the invention is to provide a method which may be used in aligning bodies and surfaces having various but compatible protrusions and opening arrangements.

These and other objects are accomplished by one aspect of the invention in which a body having a relatively large number of protrusions, such as the aforementioned elastic mask, is placed against a surface also having a large number of openings, such as the end faces of the aforementioned honeycomb structures, some or all of which will be engaged by the protrusions when the body is laterally and angularly aligned, and the surface, the body or both are vibrated until the protrusions engage. Where the body may align in more than one lateral position, it is initially positioned approximately at its final desired location against the surface. Lateral movement of the body across the surface is preferably limited during the vibrating step to assist in laterally aligning the body with the surface, to prevent alignment in an undesired location or both. The body and surface are also rotated with respect to one another to assist in their angular alignment. Rotation and vibration is preferably accomplished in one step by the use of rotational vibration.

It is also an object of the invention to provide methods for fitting masks having protrusions to the end face of a honeycomb structure in the fabrication of solid particulate filter bodies and other selectively manifolded honeycomb structures.

It is yet another object to provide a method for fitting such mask and honeycomb structures having either circular or non-circular shaped cross-sections.

It is yet another object to provide methods for fitting such masks and honeycomb structures irrespective of the pattern of protrusions selected.

It is yet another object to provide methods for fitting such masks to such structures which may be automated.

According to the invention, these and other objects may be accomplished in several ways, each of which generally involves providing a honeycomb structure and a pair of masks, approximately centering at least one mask over an end face and vibrating it into alignment on the end face with its openings exposing a subset of cells and its protrusions engaging some or all of the remaining cells. Preferably, both masks are fitted to the end faces in this manner. A mask is approximately centered by positioning it against an end face with its axial center located within an area about the axial center of the end face, which, if the mask center were to remain in that area, would cause the mask to align only in a position with its axial center opposite that of the end face.

One method is to provide a honeycomb structure and a pair of masks each having openings positioned so as to expose substantially different subsets of cells when either mask is aligned on an end face with its axial center opposite that of the end face. One embodiment is described using such a honeycomb structure with square cells arranged in rows and columns across circular end races, the axial centers of which lie at the center of the one cell. A pair of masks are provided having rows and columns of alternate opening and protrusion locations, the axial center of one mask being at an opening and that of the other mask being at a protrusion location. An alternate approach is to provide a pair of masks having openings identically spaced from each of their axial centers and a honeycomb structure having cellular arrangements at its end faces which cause substantially different cells to be exposed through the masks depending upon their relative angular orientation when centered on the end face. This is illustrated in two embodiments in which a honeycomb structure is again provided with its cells substantially arranged in rows and columns across circular end faces with the axial centers of the end faces lying in a thin wall between cells, first at a midpoint between its intersections with other thin walls and second at the intersection of two or more thin walls.

It is a further object of the invention to provide an apparatus for automatically aligning a mask having a plurality of protrusions or similar body with an end face of a honeycomb structure.

According to the invention, these and other objects are accomplished by providing means for vibrating the mask against the end face and means for limiting the lateral movement of the mask so as to confine its axial center to a small area about the axial center of the end face. Although various types of vibrating motions may be employed, rotational vibration means are preferred. Rotational vibration as used herein is typically generated by an initial abrupt twisting motion in one direction about a rotational axis followed by a slower twisting return in the opposing direction. The rotational axis is not moved laterally during the vibration. An object placed on a plane perpendicular to the rotational axis will be made to hop in the direction of the initial twisting motion and desirably be left relatively undisturbed on the plane by the return twist. An object centered on the rotational axis will typically rotate about that axis in a series of short hops while an object placed off-center will typically rotate by orbiting about that axis. If rotational vibration means are not used, means are desirably provided for rotating the mask and end face with respect to one another so as to assist in their angular alignment. The means for limiting the lateral movement of the mask confines its axial center to an area over the axial center of the end face, desirably to an area approximately equal to or less than one of the cells over which the mask is centered. Means may also be provided for indicating that substantially different subsets of cells are exposed at the two end faces.

BRIEF DESCRIPTION OF THE DRAWINGS

Various aspects of the invention are better understood with reference to the accompanying drawings, in which.

DETAILED DESCRIPTION OF THE INVENTION

Figure 1:
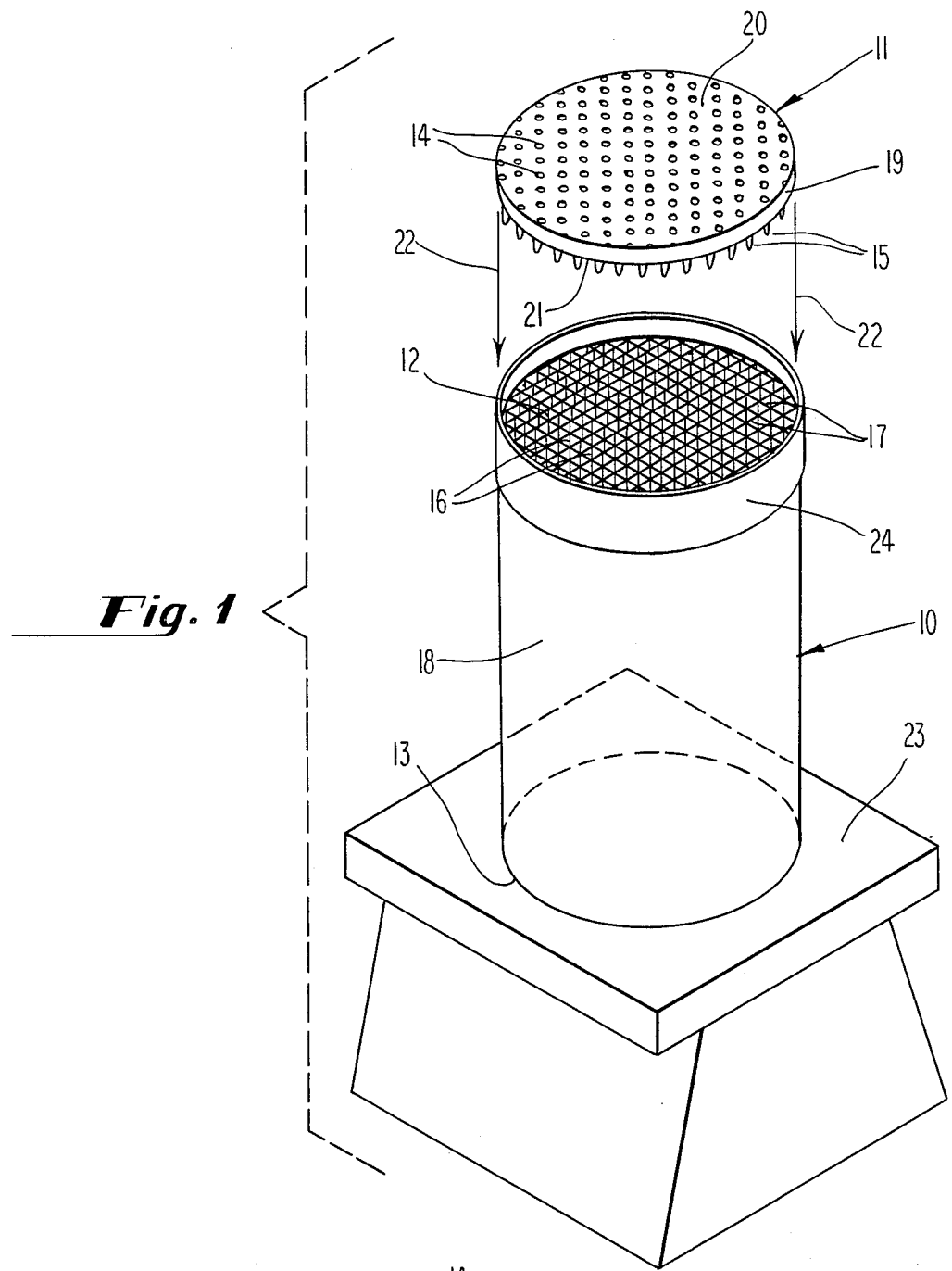
FIG. 1 is a schematic view of apparatus for aligning a mask having protrusions to an end face of a honeycomb structure.
Figure 3:
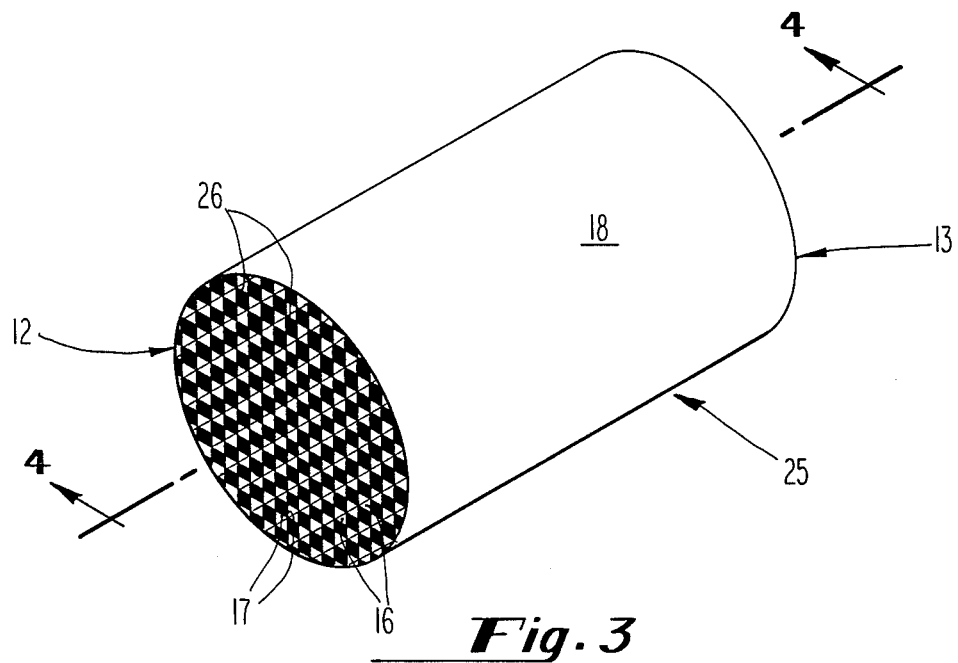
FIG. 3 is a schematic view of a preferred filter body fabricated with the mask and honeycomb structure of FIGS. 1 and 2.
Figure 4:
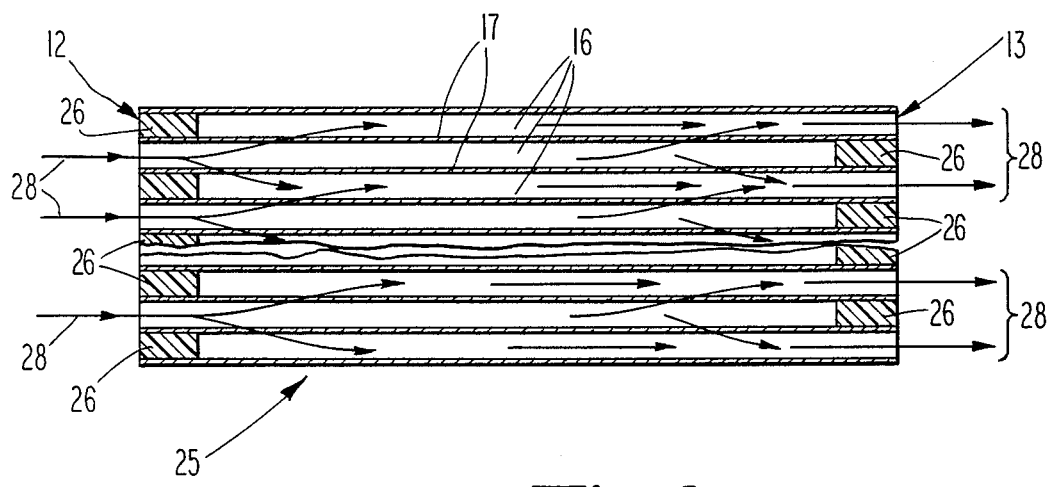
FIG. 4 is a cross-sectional view of the filter body of FIG. 3 along the lines 4-4 showing the pattern of cells being plugged at alternate ends.

FIG. 1 depicts a honeycomb structure 10 and an exemplary elastic mask 11 used to selectively plug cells 16 of the structure 10 in the fabrication of a solid particulate filter body 25 depicted in FIGS. 3 and 4. The honeycomb structure 10 is cylindrical and consists of a large number of mutually adjoining hollow passages or cells 16 which extend in a substantially mutually parallel fashion through the structure through and between a pair of opposing and substantially identical, circular end faces 12 and 13 (hidden in FIG. 1). The cells 16 are formed by thin porous walls 17 which extend continuously through the structure 10 between the end faces 12 and 13 and intersect with one another so as to form a continuous matrix across the end faces. The honeycomb structure 10 may be formed from a variety of materials including ceramics, glass-ceramics, glasses, metals, cermets, resins or organic polymers, papers or textile fabrics (with or without fillers), etc. and various combinations thereof. Honeycomb structures having the necessary thin, porous interconnected walls desired for solid particulate filtering applications are preferably fabricated from plastically formable and sinterable finely divided particles and/or short length fibers of substances that yield a porous sintered material after being fired to affect their sintering, especially powdered metals, ceramics, glass-ceramics, cermets, and other ceramic based mixtures. As desired, any suitable or conventional fugitive or combustible (burn-out) additive can be dispersed within the formable and sinterable mixture so as to provide appropriate and adequate open porosity in the sintered material. Requisite open porosity can be designed within the walls by raw material selection as it is described in U.S. Pat. No. 3,950,175. A method of forming an essentially thermostable honeycomb monolith from an extruded ceramic material which is preferred for moderately high temperature solid particulate filtering applications (less than approximately 1500° C.) is described in the aforementioned application Ser. No. 165,646. Several cordierite compositions resulting in various thin wall porosities are also described for use with the method. The cells 16 have been arranged in substantially mutually parallel rows and substantially mutually parallel columns and with the possible exception of those at the edge of the end face have been provided with square transverse cross-sectional areas which are exposed at the end faces 12 and 13. The square, transverse cross-sectional geometries, row and column cellular arrangement and circular end faces are all exemplary and may be varied both in fabricating filter bodies and in employing the subject invention.

The mask 11 has a central body 19 formed between circular outer faces 20 and 21, a number of openings 14 extending through the body 19 and a number of protrusions 15 extending from the lower outer face 21. The positioning of the openings 14 in and the protrusions 15 on the mask 11 are made with respect to the cells 16 of the honeycomb structure 10 with which the mask 11 is used. Each opening 14 is positioned on the mask to coincide with the open end of a cell to be charged with a plugging material when the mask is properly positioned over the end face. The openings 14 are suitably sized to expose the open end of a selected cell sufficiently for charging but not so large as to expose part or all of any cell not to be charged. Larger openings can be provided to expose several adjacent cells if desired. Preferably, the mask is formed from an elastic polymer so as to conform to distortions in the cross-sections and arrangement of the cells 16 and in the surface of the end face 12 or 13. The protrusions 15 preferably are also elastic and taper from a cross-sectional diameter greater than the minimum cross-sectional diameter of the cells 16 with which they engage to diameters less than that minimum cell diameter so as to sealably fit the cell ends when the mask is fitted to the end face. The fabrication and use of the mask 11 is more fully described in the aforesaid copending application of Max Montierth, Ser. No. 283,734, now U.S. Pat. No. 4,411,856. Although an elastic mask 11 is preferred for the fabrication of solid particulate bodies, it is envisioned that the subject invention may be used with simply a flexible or even a rigid mask or other bodies having a number of protrusions similar to those of the mask 11 so long as the protrusions are positioned and sized to engage cells in some lateral and angular orientation of the body on the open surface.

According to the invention, after being placed on the end face 12, as indicated by the arrows 22, the mask 11 is rapidly vibrated about and around the center of the end face 12 until it moves into lateral and angular alignment with its protrusions 15 engaging the cells 16. In FIG. 1, the honeycomb structure 10 has been positioned on the surface 23 of a mechanical vibration source. Preferably the surface 23 imparts a rotational vibrating motion. A suitable device has been constructed by mounting to the base of a commercially available rotary vibratory parts feeder in place of its feeder bowl, a flat plate. The surface of the plate rotates back and forth through a short arc about its center, the motion being sharp in one direction and relatively slower in the return direction. The surface experiences no net lateral or rotational movement but a sufficiently light object (such as a structure and mask) placed upon its surface will rotate and, if placed off-center from the rotational axis, orbit in short hops about the rotational axis. Desirably, means are also provided to control the amplitude of the vibratory motion generated and thereby control the rotational speed of the mask and/or structure. Vibration amplitude of the previously referred to parts feeder was controlled by means of a rheostat. A vibrational frequency of about 60 hertz has been used to seat the described masks but it is envisioned that a wide range of frequencies, approximately 30 to 200 hertz or more, may be employed successfully in seating the described flexible masks. Other frequency ranges may be found desirable for other applications of the invention. Rotational vibration is transmitted from the surface 23 to the mask 11 resting on the end face 12 through the structure 10 which is preferably centered over the axis of rotation of the surface to minimize lateral movement of structure 10 and mask 11. Alternatively, it is envisioned that the mask 11 may be directly contacted by a vibration source and vibrated into alignment. Also it is envisioned that the positions of the mask 11 and structure 10 may be reversed with the mask 11 on the surface 19, its protrusions extending upwards. Although random, linear or orbital (planar, orbitting movement without rotation of the vibrating plane) vibration may be used, rotational vibration in the plane between the end face 12 and mask 11 is preferred as it causes the mask 11 to rotate steadily around the end face 12 facilitating angular as well as lateral alignment. Rotation of the mask with respect to the end face may have to be otherwise accomplished if random, linear or orbital vibration is used. Preferably, the structure 10 is temporarily held in position on the surface 23 to better transmit the vibrational motion from the surface 19 to the mask 11. The structure may be held by any of several suitable methods including the use of a removable temporary adhesive, clamps, or a pair of pins or the like extending through the platform surface 23 and into a pair of the structure's cell ends sitting on the surface 23. A collar 24 has been attached to the side walls 18 of the structure 10 and extends above the end face 12 so as to confine the mask 11 within the collar. In this manner, the lateral movement of the axial center of the mask 11 across the end face 12 is limited to a small predetermined area about the axial center of the end face 12. The faces 20 and 21 of the mask 11 can be appropriately sized to define the size of the area about the axial center of the end face 12 in which axial center of the mask 11 is confined. It is envisioned that in some configurations, proper alignment of a mask 11 and end face 12 or 13 may be achieved simply through orbital vibration without the use of a constraint such as the collar 24. Other means of limiting the lateral movement between the mask and honeycomb structure will be described subsequently.

To fabricate the solid particulate filter body 25, the mask 11 is aligned over the end face 12 with its openings exposing a first subset of cells. A similar mask (not depicted) is aligned over the end face 13 of the honeycomb structure 10 with its openings exposing a substantially different subset of cells. The exposed cells 16 are plugged with a suitable material passed through the openings 14 of both masks. It will be appreciated, of course, that each end face may be covered with a mask and filled in sequence or that both end faces may first be covered and then filled simultaneously or in sequence. The filter body 25 of FIGS. 3 and 4 has been formed from the structure 10 of FIGS. 1 and 2 by plugging the cells 16 in a desired checkered pattern at the end faces 12 and 13. The pattern of plugged cells on end face 12, depicted in FIG. 3, is reversed on the hidden end face 13 as can be ascertained in FIG. 4 where the filter body 25 has been sectioned along a line (row or column) of cells 16 revealing the plugs 26 formed in alternating cell ends along the line. To achieve the checkered plugging pattern exhibited by the filter body 25 in FIGS. 3 and 4, the openings 14 of the mask 11 used with the structure 10 were arranged in mutually parallel rows and columns across the mask surface with protrusions 15 located therebetween to engage all or substantially all of the remaining alternate cells at the end face. It will be appreciated that for various applications other than filtering, it may be desirable to plug some cells at both their ends, to leave some cells unplugged or both. Also, plugging patterns other than the depicted checkered arrangement may be employed. In each case, however, the plugging pattern on each end face of the filter body will be substantially, if not, identically, the reverse of that at the remaining end face. Typical fluid flow through the filter body 25 is indicated by the arrows 28.

The aligning of bodies, such as flexible masks to honeycomb surfaces such as the described end faces, may be automated. For the fabrication of solid particulate filter bodies, automation is simplified by using particular honeycomb structures and masks to assure proper cell exposure through the masks at the two end faces.

Figure 2:
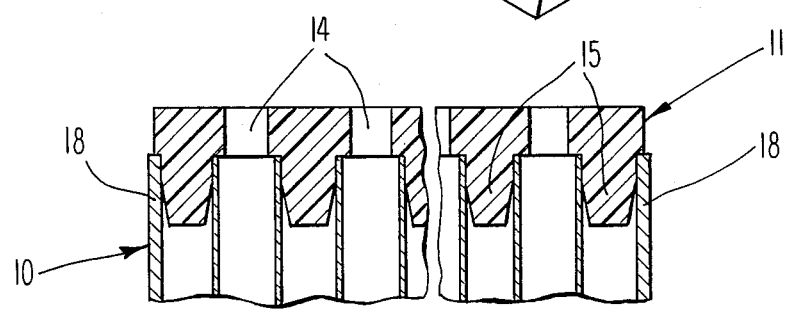
FIG. 2 is a cross-sectional view of the mask fitted to the end face of the honeycomb structure of FIG. 1.
Figure 5:
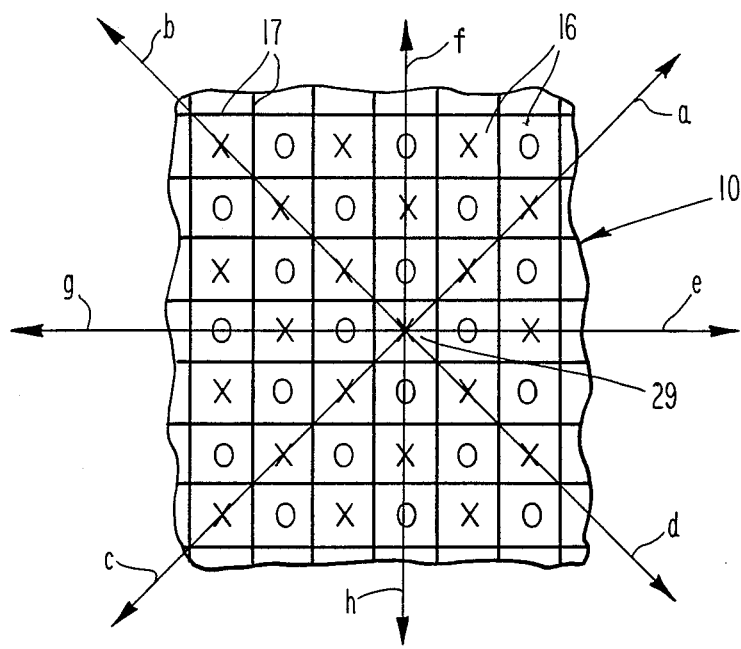
FIG. 5 depicts patterns of openings and protrusion locations for the central portions of reverse masks centered over a cell on the end faces of a honeycomb structure.

A first embodiment comprises in part a honeycomb structure such as the structure 10 of FIGS. 1 and 2 with the axial centers of its end faces located at or approximately at the center of the transverse cross-sectional area of one of its square cells. A pair of so-called "reverse" masks is also provided. The openings 14 of each of the reverse masks will expose completely or substantially different subsets of cells when each of the masks is identically located on an end face of this honeycomb structure. FIG. 5 depicts the area of an end face 12 or 13, about its central cell 29 and adjoining cells 16 of the structure 10 arranged as they are arranged across the end faces 12 and 13 in rows and columns. The cells 16 are divided into alternate subsets which are identified by "X's" and "O's" and yield the desired checkered pattern of plugged cells illustrated in FIGS. 3 and 4. The "X's" and "O's" also represent the locations of openings and possible protrusions, respectively, on one of the reverse masks and the converse on the other reverse mask of the pair. Again, a protrusion typically but not necessarily is located opposite each cell end not to be filled. Each reverse mask is fitted to an end face by approximately centering the mask against the end face (i.e. positioning the mask with its axial center within the confines of the central cell 29 or sufficiently near to the central cell so that the axial center of the mask is prevented from aligning over any cell other than the central cell 29 due to the thickness of the protrusions) and vibrating the mask into alignment. Again, means such as the collar 24 (see FIG. 1) are preferably provided to assure that the axial center of the mask aligns over the center cell 29. This area within which the axial center of the mask is initially positioned and later confined during alignment is centered at the center of the central cell 29, and, in the case of the uniformly sized cells 16 depicted, can have a maximum diameter at least as great as a cell pitch (i.e. the distance between the centers of adjoining cells in a row or column), and may have a somewhat greater diameter, depending upon the diameters of the protrusions at their tips, but in no event will the maximum diameter be as great as twice the magnitude of a cell pitch as this would allow the mask to center over a cell other than the central cell 29. Each of the reverse masks will align opposite the center cell 29 in one of four possible angular orientations separated by 90°. On the mask having its protrusion locations represented by "X's", apart from the protrusion which may be provided to engage the central cell 29, the four protrusion locations closest to the axial center of the mask will always align in those four cells lying along the diagonal lines a, b, c, and d and the mask will always expose the same subset of cells indicated by the "O's". Similarly, the four protrusion locations closest to the axial center of the remaining reverse mask (represented in FIG. 5 by the "O's" about the central cell 29) will always align only in the cells lying along the vertical and horizontal lines e, f, g and h and expose only the cells identified by "X's". It will be noted that in this embodiment, the positions of the plugged cells at the end faces of the filter body are not congruently spaced when measured from the center of the central cell at each of the end faces. Similarly, the openings 14 in each of the reverse masks will not be congruently spaced between the masks when measured with respect to their axial centers.

Figure 6:
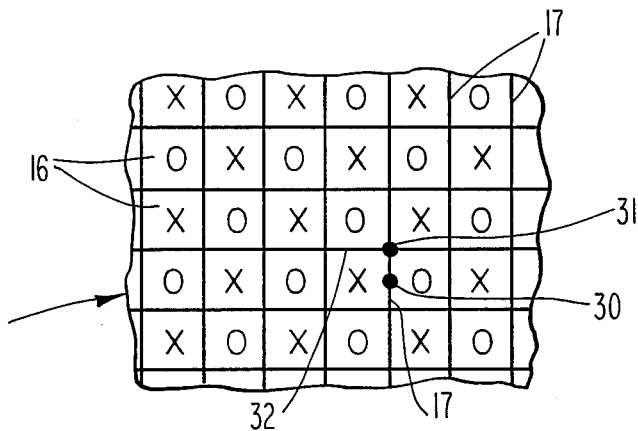
FIG. 6 depicts in view of the central portion of an end face and the two subsets of cells which are exposed using identical masks centered on the end face at one of two locations over a thin wall forming the cells.
Figure 7:
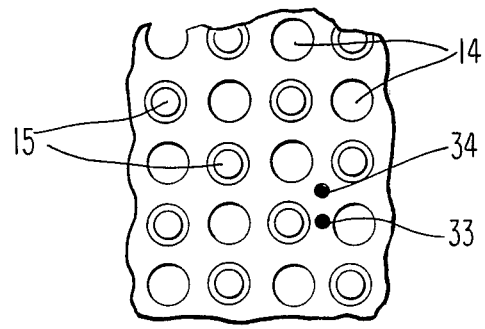
FIG. 7 is an exploded view of the central portion of identical masks showing the two corresponding locations of their axial centers used with each of the two axial center locations of the end face represented in FIG. 6.

Two other embodiments are depicted with respect to FIGS. 6 and 7 and utilize a pair of identical masks with a honeycomb structure having the axial centers of its end faces in a thin wall between cells. The honeycomb structure 10 may again be provided circular end faces 12 and 13, the axial centers of which are located in the center of or near the center of a thin wall 17: in one embodiment at or near the mid point of a length of wall between adjoining cells 16, as indicated by the point 30 in FIG. 6, and in another embodiment at or near the intersection of a pair of thin walls, as indicated by the point 31 at the intersection of the thin walls numbered 17 and 32 in the same figure. A pair of identical circular masks are used, again having openings 14 and protrusion locations 15 alternated in rows and columns as indicated in FIG. 7 corresponding to the the rows and columns of cells of FIG. 6. Their axial centers lie, in the first embodiment, between an opening location and an adjoining protrusion location as represented by the point 33 (when used with end faces centered at the point 30), and, in the second embodiment, between four adjoining opening and protrusion locations as represented by the point 34 (when used with end faces centered at point 31), as depicted in FIG. 7. A mask having its axial center at the point 33 when aligned on the end faces 12 and 13 with that point over the point 30 will lie in one of two orientations 180° apart. Each orientation will expose a different subset of cells indicated by the "X's" and "O's", respectively, in FIG. 6. A mask having its axial center at the point 34 when aligned on an end face 12 or 13 with that point over the point 31 will lie in one of four orientations 90° apart. Each orientation will again expose one of the two subsets of cells indicated by the "X's" and "O's" in FIG. 6, the subsets of cells exposed by adjoining orientations (i.e. those separated by 90°) being different while those exposed by opposite orientations (i.e. separate by 180°) being the same. In either case, alignment of the mask and end face axial centers can again be achieved by approximately centering the mask against the end face (i.e. positioning it with its axial center within an area centered about the axial center of the end face and sufficiently small so that the mask will only align with its axial center opposing that of the end face) and vibrating it into alignment while its axial center remains in that area. Again, this area will have a diameter somewhat less than twice the magnitude of the cell pitch, depending upon the tip diameters of the protrusions, but may always be as great as one cell pitch in magnitude regardless of the protrusion tip diameter.

It is envisioned that in some applications, it will be found that the masks may be approximately centered in selected initial angular orientations on the end face and vibrated into alignment in a preselected relative angular relationship. Alternatively, the proper relative angular orientation of the identical masks would be verified in some automatic fashion to assure that when desired, different subsets of cells are exposed at each of the end faces in the honeycomb structure for plugging. One way would be to mark each mask in some way, say at a point on its periphery, so that the relative angular orientation of the two masks can be compared by suitable sensing equipment and circuitry to signal that desired relative angular alignment is achieved. Another way would be to optically view either end face of a structure having a pair of masks fitted or a structure having cells plugged at one end face and a mask fitted to its remaining end face to ascertain if light is passing through the structure between the end faces. Appropriately aligned masks should allow no light to pass through the structure in the area where cells are to be alternately plugged. An appropriate signal can be generated to indicate proper alignment is achieved and that the structure is ready for plugging or that alignment was not achieved.

It is further envisioned that where elastic masks are being automatically fitted to honeycomb structures, it may be necessary to provide means to press the mask against the end face to assure complete insertion of the elastic protrusions.

Although the invention has been described with respect to aligning circular masks to circular end faces and square cell cross-sections, it is envisioned that the invention may be successfully employed with other end face and cellular geometries. Other desirable end face geometries may include oval and racetrack configurations. Cellular geometries can be circular, oval or any suitable polygon shape, including triangle, hexagon, and any quadralateral. A corral, if provided in such cases, may be circular allowing 360° rotation of the body about the surface. In such cases, the axial center of the mask and end face will lie at the center of the smallest circular area in which the body or end face may be axially rotated 360°, typically the midpoint of the longest transverse axis across the mask or end face (e.g. the diagonal of a square or rectangular end face). Alternatively, a non-circular corral may be used to limit the range of angular motion of a noncircular mask so as to assure alignment in a particular or one of a limited number of angular orientations.

It is also envisioned that a corral, if provided, need not be affixed to the honeycomb structure as previously described, but may alternatively be affixed to some other stationary object or even affixed to the vibration source.

Moreover, it is envisioned that in some applications lateral and/or angular alignment may be assisted by the use of unusually sized and/or shaped cells and protrusions provided at discrete locations on the body and surface to more particularly limit the lateral and/or angular orientation in which the body may align on the surface.

Figure 8:
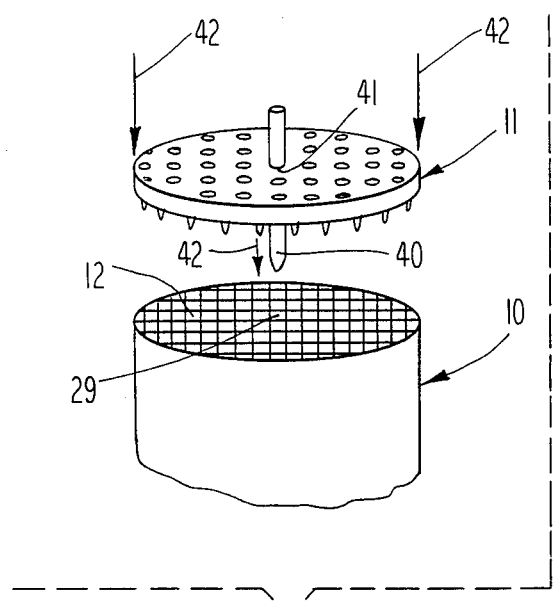
FIGS. 8 through 10 depict various embodiments using rigid members extending between a mask and end face to restrict their relative lateral or lateral and angular movement during the step of vibrating the mask into alignment.
Figure 9:
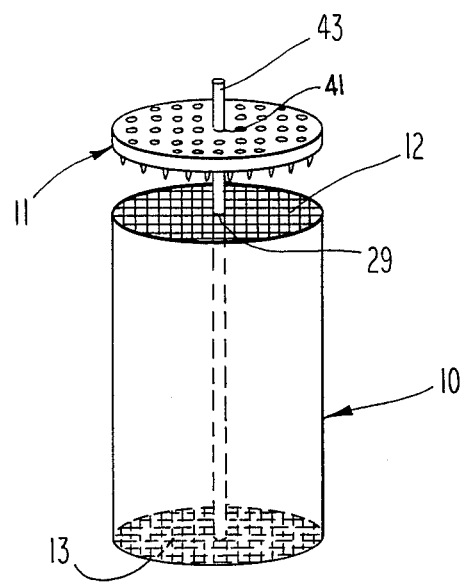
Figure 10:
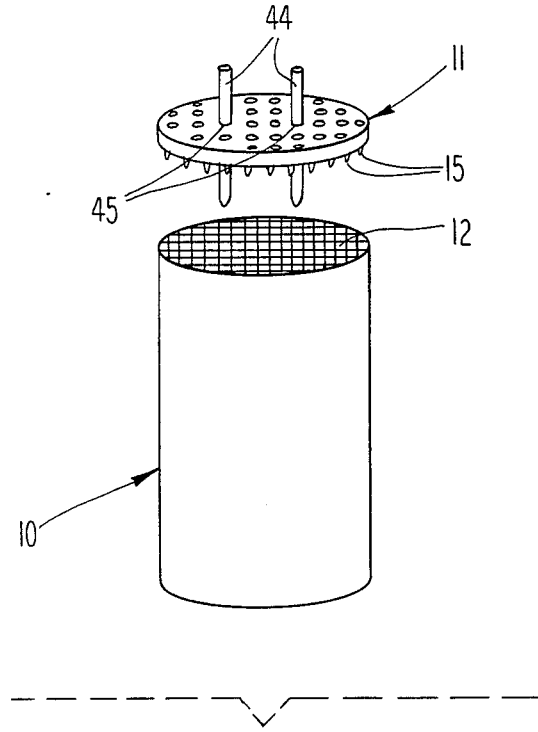
Figure 9A:
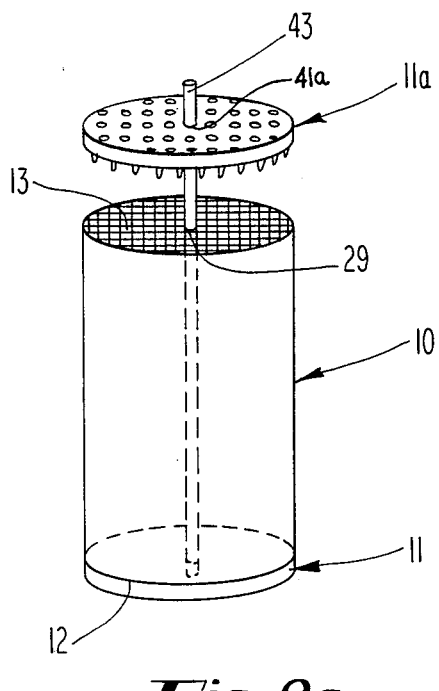

It is also envisioned that means other than a corral around the periphery of the mask (or honeycomb structure) may be used to limit the relative lateral and, if desired, rotational motion between the body carrying the protrusions in the honeycomb surface. For example, a rigid member such as a pin or similar means may be passed through and between a mask and an end face of a honeycomb structure as fixing their relative lateral positions during the vibrating step. In one embodiment depicted in FIG. 8, a member 40 has been inserted through an opening 41 at the axial center of a first reverse mask 11. The mask 11 with member 40 is positioned against an end face 12 of the structure 10 as indicated by the arrows 42 with the member 40 extending into the central cell 29 of the end face 12. The mask 11 is then vibrated into alignment. In this configuration, the mask 11 is free to rotate but is constrained in the lateral movement of its axial center. The member 40 may then be removed through the mask 11 and cement pressed through the opening 41 into the proximal end of the central cell 29 during the plugging step. In a second embodiment, a solid rod 43 or the like may be passed through the length of a central cell 29 of a honeycomb structure, as indicated in FIGS. 9 and 9a. In FIG. 9, the rod 43 extends from the central cell 29 at a first end face 12 of the structure 10. A first reverse mask 11 similar to that in FIG. 8 and having a similar opening 41 at its axial center is positioned with the rod 43 through the opening 41 and vibrated into alignment. The structure 10 is then inverted, as indicated in FIG. 9a, with the rod 43 protruding from the remaining end face 13 of the structure 10. The remaining mask 11a of the pair of reversed masks, which is also provided with an opening 41a at its axial center, is placed over the rod 43 and against the end face 13 and vibrated into alignment. The rod 43 is then removed from the structure for plugging of the alternate cells at its two end faces 12 and 13 through the masks 11 and 11a. The opening 41 or 41a at the axial center of the one reverse mask 11 or 11a that corresponds to a protrusion location in the plugging pattern of that mask is temporarily capped to prevent the plugging of that end of the central cell 29. It is further envisioned that two or more rigid members 44, as depicted in FIG. 10, may be provided between an end face 12 of a honeycomb structure 10 and mask 11 to curtail relative rotational as well as relative lateral movement between the mask 11 and the end face 12. The members 44 may be inserted into any two of the openings 45 of the mask and the members 44 inserted into the proper corresponding cells at the end face 12. The protrusion 15 of the mask 11 may then be vibrated into engagement.

Lastly, relative movement between a first body member and a second honeycomb surface member need not be restricted by a means extending between the two members but rather may be restricted by means, again such as a pin, extending between one of the two members and a fixed object. For example, a pin may be provided protruding from the upstream face of the mask and the lateral motion of the mask restricted by fixed means such as a tube fixed in a frame which accepts and restricts the movement of the pin protruding from the mask to the inner diameter of the tube.

While fundamental novel features of the invention have been shown and described with respect to a preferred and other embodiments, it will be understood that various omissions, substitutions and changes in the form and details of the methods and apparatus heretofore described may be made by those skilled in the art without departing from the scope of the invention which is set forth in the following claims.

What is claimed:

1. A method of fitting a first member having a plurality of protrusions extending therefrom to a second member having a honeycomb surface with a multiplicity of openings extending therethrough, said protrusions engaging selected ones of said openings when said first member is fitted to said second member, comprising the steps of:

positioning said first member with said protrusions against said surface; and simultaneously vibrating and rotating at least one member relative to the other member until said protrusions engage said selected openings.

2. The method of claim 1 wherein said step of positioning further comprises approximately centering said first member against said surface.

3. The method of claim 1 wherein said step of vibrating comprises rotationally vibrating at least one of said two members.

4. The method of claim 3 wherein both members are rotationally vibrated during said vibrating step.

5. The method of claim 1 further comprising the step of limiting the relative lateral movement between said two members during said vibrating step.

6. The method of claim 1 wherein said step of vibrating further comprises vibrating said members at a frequency of approximately thirty cycles per second or more.

7. A method of fabricating a solid particulate filter body comprising the steps of:
providing a honeycomb structure having a multiplicity of hollow cells extending therethrough and through and between a pair of end faces thereof, said end faces being substantially identical and formed by a matrix of porous intersecting walls also extending therebetween and therethrough;
providing a pair of masks, each mask having a pair of opposing faces, a plurality of openings extending between and through said opposing faces and a plurality of protrusions extending from one opposing face;
approximately centering one mask with one end face; and
simultaneously vibrating and rotating said one mask relative to said structure and into alignment against said one end face with its openings exposing a first subset of cells and its plurality of protrusions engaging an equal plurality of the remaining cells.

8. The method of claim 7 further comprising the steps of:
approximately centering the remaining mask with the remaining end face; and
simultaneously vibrating and rotating said remaining mask relative to said structure into alignment against said remaining end face with its openings exposing substantially all of said remaining cells and its protrusions engaging an equal plurality of said first subset of cells.

9. The method of claim 7 wherein said step of providing a honeycomb structure further comprises providing said structure with the axial centers of each of said two end faces within the open transverse cross-sectional area of one cell, and said step of providing a pair of masks further comprises providing one mask the openings of which exposes one subset of cells and a second mask the openings of which exposes substantially all of the remaining cells of the multiplicity when either mask is fitted to one of the end faces with its axial center opposite said one cell.

10. The method of claim 9 further comprising during said vibrating step the step of restricting the lateral movement of the axial center of said one mask to substantially the transverse cross-sectional area of said one cell.

11. The method of claim 7 wherein said step of providing a honeycomb structure further comprises providing said structure with the axial centers of its two end faces extending through a thin wall between cells and said step of providing a pair of masks further comprises spacing the openings through each mask substantially identically from the axial centers of each mask.

12. The method of claim 11 further comprising during said vibrating step the step of restricting the lateral movement of the axial center of the one mask to an area centered on said thin wall and approximately equal to the area of one cell adjoining the wall.

13. The method of claim 7 or 12 wherein said vibrating step comprises orbitally vibrating the mask with respect to the end face.

14. The method of claim 13 wherein said vibrating step further comprises orbitally vibrating the structure.

15. The combination comprising:
a honeycomb structure having a pair of opposing end faces and a multiplicity of cells formed by thin walls extending through and between said end faces;
a body having a plurality of protrusions extending therefrom and positioned with its protrusions against one end face of said honeycomb structure;
means for limiting the lateral motion of said body across said end face and for permitting rotation of said body and its protrusions relative to said end face; and
means for vibrating and means for rotating said body with respect to said one end face.

16. The combination of claim 15 wherein said means for limiting further comprise corral means positioned around the periphery of said body.

17. The combination of claim 15 wherein said means for limiting further comprises a member extending between and into said body and said one end face.

18. The combination of claim 15 wherein said vibrating means further comprises means for rotationally vibrating said body with respect to said one end face.

19. The combination of claim 15 wherein each end face of said honeycomb structure has an axial center located within the same one cell, said body has an axial center and further comprises a plurality of openings extending therethrough which expose a first subset of said cells when the body is aligned with its axial center opposite said one cell, and the combination further comprising:
a second body centered over the remaining end face of the structure and having a plurality of protrusions extending therefrom and a plurality of openings extending therethrough exposing a substantially different subset of said cells, the distances of the openings and protrusions of the second body from the axial center of the second body being substantially the same as the distances of the protrusions and openings, respectively, of the first body from the axial center of the first body.

20. The combination of claim 15 wherein each end face of said honeycomb structure has an axial center located within the same thin wall, said body has an axial center and further comprises a plurality of openings extending therethrough which expose a first subset of said cells when the body is aligned with its axial center opposite an axial center of one of said end faces, and the combination further comprising:
a second body having an axial center, a plurality of protrusions and a plurality of openings spaced from the axial center of said second body the same distances as the openings of said first body are spaced from the said axial center of said first body and fitted to the remaining end face of the structure with axial center of said second body opposite the axial center of said remaining end face, and the openings of said second body extending therethrough exposing a substantially different subset of cells.

21. The combination of claim 20 further comprising: means for generating a signal indicating that substantially different subsets of said cells are exposed by the openings of said first and second bodies.

* * * * *